(12) United States Patent
Grabowski et al.

(10) Patent No.: US 7,148,277 B2
(45) Date of Patent: Dec. 12, 2006

(54) AQUEOUS COMPOSITIONS BASED ON POLYCHLOROPRENE

(75) Inventors: Stefan Grabowski, Dormagen (DE); Volker Wege, Neuss (DE); Rüdiger Musch, Bergisch Gladbach (DE); Knut Panskus, Leverkusen (DE); Thiemo Marx, Viersen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/856,916

(22) Filed: May 28, 2004

(65) Prior Publication Data

US 2006/0069196 A1 Mar. 30, 2006

(30) Foreign Application Priority Data

May 30, 2003 (DE) .............................. 103 24 305
Apr. 7, 2004 (DE) ...................... 10 2004 017 553

(51) Int. Cl.
*C08K 3/34* (2006.01)
(52) U.S. Cl. ...................... 524/273; 524/493; 524/588; 524/783
(58) Field of Classification Search ................ 524/783, 524/493, 588, 273
See application file for complete search history.

(56) References Cited

U.S. PATENT DOCUMENTS

| 5,017,630 A | * | 5/1991 | Raines et al. ................ 523/334 |
| 5,773,544 A | | 6/1998 | Christell et al. ............. 526/223 |
| 6,017,998 A | * | 1/2000 | Duan et al. .................. 524/591 |
| 6,319,352 B1 | | 11/2001 | Simmler et al. ............. 156/332 |
| 6,660,380 B1 | * | 12/2003 | Ishida et al. ................. 428/403 |
| 6,710,091 B1 | | 3/2004 | Womelsdorf et al. ......... 516/33 |
| 2002/0120045 A1 | | 8/2002 | Musch et al. ............... 524/285 |
| 2003/0221778 A1 | | 12/2003 | Musch et al. ............... 156/325 |

FOREIGN PATENT DOCUMENTS

| CA | 1 155 581 | | 10/1983 |
| CA | 2162914 | | 9/1995 |
| DE | 197 03 582 | | 8/1998 |
| DE | 101 63 256 | | 7/2003 |
| JP | 11-209523 | * | 8/1999 |

OTHER PUBLICATIONS

Handbook of Adhesives, 3$^{rd}$ edition, Part 15, (month unavailable) 1990, p. 301, "Neoprene (Polychloroprene)-Based Solvent and Latex Adhesives".
Adhesives Age, Jan. 2001, pp. 17. 18, 19, 20, 22, 23, R. Musch et al, "High-Yield Bonds".
Technical Brochure from Bayer AG, Technical Information KA-KR-0001e/Jan. 5, 1996, pp. 1-3, "Spray-mixing Adhesives based on Dispercoll C for Foam bonding".

* cited by examiner

*Primary Examiner*—Bernard Lipman
(74) *Attorney, Agent, or Firm*—Michael A. Miller

(57) ABSTRACT

Water-containing compositions containing polychloroprene particles, zinc oxide particles having an average particle size of less than 150 nm and water. The compositions can be used as adhesives and/or sealants.

20 Claims, 1 Drawing Sheet

US 7,148,277 B2

AQUEOUS COMPOSITIONS BASED ON POLYCHLOROPRENE

CROSS REFERENCE TO RELATED PATENT APPLICATION

The present patent application claims the right of priority under 35 U.S.C. §119 (a)–(d) of German Patent Application No. 103 24 305.4, filed May 30, 2003 and German Patent Application No. 102004017553, filed Apr. 7, 2004.

BACKGROUND OF THE INVENTION

1. Field of the Invention

The present invention relates to water-containing compositions, and in particular to aqueous polymer dispersions based on polychloroprene, to processes for their production and to their use, in particular for the production of coatings, and in particular for the production of adhesive coatings, and to a process for bonding substrates using the compositions.

2. Description of the Prior Art

Contact adhesives based on polychloroprene (CR) are predominantly solvent-containing adhesives which are applied to the substrates to be bonded and dried. By then joining the substrates under pressure a bonded structure is obtained having a high initial strength immediately after the joining process. The subsequent crosslinking produces the final curing.

For ecological reasons there is an increasing need for suitable aqueous CR adhesive dispersions which can be processed to form corresponding aqueous CR adhesive formulations. These are for example used in the "spray-mixing" process, in which the aqueous adhesive formulation and a coagulating agent are separately conveyed through a spray gun and finally mixed in the spray jet, after which the CR adhesive coagulates on the substrate. An overview of this method is provided for example in "Handbook of Adhesives", Irving Skeist, Chapman Hall, New York, 3$^{rd}$ Ed. 1990, Part 15, page 301, R. Musch et al, Adhesives Age, January 2001, page 17, "Spray-Mixing Klebstoffe auf Basis Dispercoll®C für die Schaumstoff-Klebung" (Spray-mixing adhesives based on Dispercoll®C for the bonding of foams), Technical Brochure from Bayer AG, No. KA-KR-0001d/01/05.96.

It is however frequently necessary to add additives, such as for example stabilizers, to the aqueous CR dispersions or formulations, in order to ensure that they have the necessary stability in storage and reliability for use or that the adhesive layers are also protected from ageing or discolouration.

For the latter purpose zinc oxide is advantageously added to aqueous formulations, since, where formulations based on polychloroprene dispersions are used, zinc oxide counteracts rapid ageing of the bonded seam and discolouration of the bonded substrates by the cleavage of HCl from the CR polymer.

The zinc oxide types so far known do however tend to form sediments and the known zinc oxide dispersions are prone to phase separation (so-called "phasing"). This sedimentation or phase separation is not acceptable, particularly where such adhesive formulations are used in the "spray-mixing" process, since blockages are produced in the nozzle as a result. The cleansing of the nozzle is highly time-consuming and costly and economically unsatisfactory.

In order to solve the problem of the sedimentation of zinc oxide, various processes have been described for producing stable, non-segmenting zinc oxide dispersions.

DE-A 19 703 582 describes the production of a zinc oxide paste by processing a commercially available zinc oxide with a wetting agent to form an aqueous zinc oxide paste. This paste has a number of disadvantages for use in aqueous adhesive dispersions. On the one hand the paste is highly viscous and thixotropic and therefore difficult to process. Also, after the paste has been incorporated into the aqueous adhesive dispersion, its resistance to sedimentation is reduced, since the zinc oxide particles in commercially available zinc oxides are present in a highly agglomerated form and the agglomerates are not completely dispersed by the described process. Also, agglomeration means that the reactive surface area is only partially available so that relatively high starting quantities of zinc oxide have to be used to obtain the required effect of the HCl absorption.

WO95/24359 describes a colloidal zinc oxide and a process for producing colloidal solutions by grinding conventional, highly agglomerated zinc oxides in the presence of polyacrylic acid, the resulting colloidal solution containing agglomerates of <100 nm. This process has the disadvantage that a very intense grinding process is necessary for overcoming the powerful interactions of the agglomerated particles in order to obtain stable dispersions having agglomerate sizes of <100 nm. The process thus requires a very high degree of technical effort and a very high amount of energy, allows only very small throughput quantities and is therefore unsuitable for the economic production of industrial product quantities. Also, due to agglomeration, the reactive surface area is only partially available and relatively high starting quantities of zinc oxide therefore have to be used to obtain the required effect of HCl absorption.

The prior art describes the use of nano zinc oxide dispersions for various applications. The term "nanoparticles" generally refers to particles having a diameter of less than about 100 nm.

Due to its large reactive particle surface area nanoparticulate zinc oxide is suitable for use as a catalyst. It is a particularly important activator for crosslinking polymers, and in particular rubbers, as described for example in WO02/083797. Compared with conventional zinc oxides with a smaller active surface area, comparable polymer crosslinking is obtained with considerably lower quantities of nanoparticulate zinc oxide.

Zinc oxide nanoparticles with particle sizes of less than about 30 nm are also suitable for use as UV absorbers in transparent organic/inorganic hybrid materials, plastics, lacquers and non-adhesive coatings. In addition, they can also be used for protecting UV-sensitive organic dyes and pigments.

Particles or agglomerates which are larger than about 30 nm lead to scattered light effects and thus to an undesirable reduction in transparency in the visible light range.

The problem on which the present invention is based was that of providing an aqueous, phasing-resistant adhesive composition which, after being applied to the substrates to be bonded and after joining has high resistance to the cleavage of HCl from the polymer and which is suitable for use in spraying processes such as for example the "spray-mixing" process without any blockages being formed in the nozzles.

SUMMARY OF THE INVENTION

The present invention is directed to a composition that includes a) polychloroprene particles, b) zinc oxide particles having an average particle size of less than 150 nm (weight average determined by ultracentrifuge) and c) water.

The present invention is also directed to an adhesive composition that includes zinc oxide particles having an average particle size of less than 100 nm (weight average determined by ultracentrifuge), as an anti-ageing agent.

The present invention is additionally directed to a method of producing an adhesive composition the includes combining zinc oxide particles having an average particle size is less than 100 nm (weight average determined by ultracentrifuge) with a polychloroprene-containing adhesive composition.

The present invention is further directed to a process for producing the above-described compositions that includes mixing a water-containing polychloroprene dispersion with a water-containing zinc oxide dispersion and optionally a water-containing silicon dioxide dispersion and optionally conventional adhesive auxiliaries selected from the group consisting of polyacrylates, polyvinylidene chloride, polybutadiene, polyvinyl acetate, styrene/butadiene rubbers, fillers, wetting agents, thickeners, fungicides, tackifying resins, plasticizers, solvents, and combinations thereof.

The present invention is also directed to a method of bonding substrates by applying the above-described compositions to a surface of at least one substrate and contacting that surface with a surface of another substrate.

The present invention is still further directed to a process for producing bonded substrates which includes applying at least one of the above-described compositions to at least one surface of at least one substrate and subsequently bonding the coated substrate with at least one additional, optionally coated substrate as well as bonded substrates obtained according to the above described methods.

DETAILED DESCRIPTION OF THE INVENTION

Figure 1:
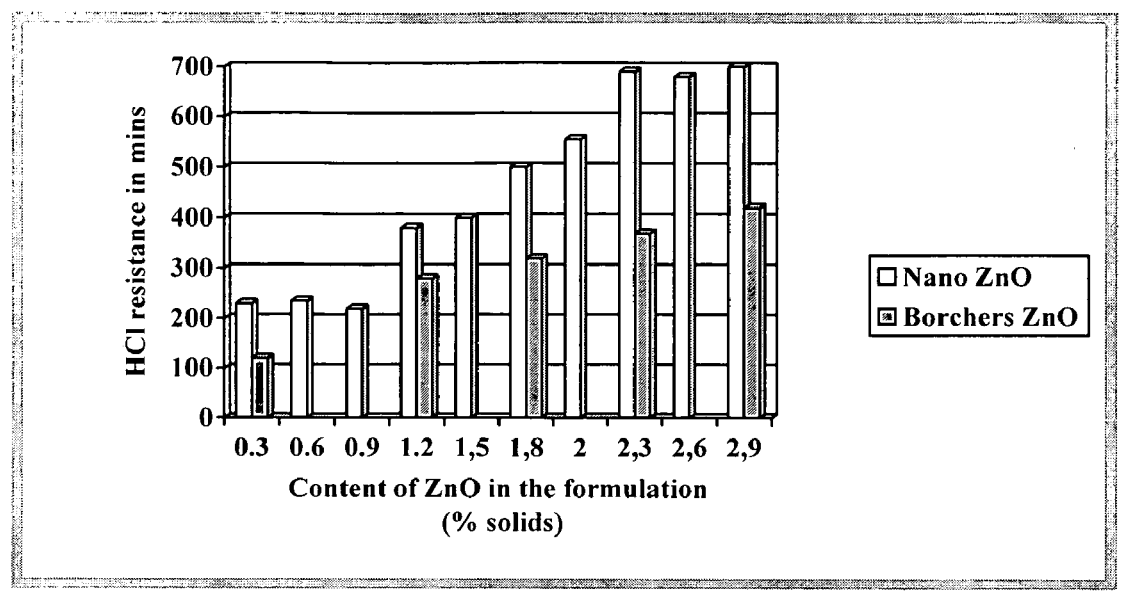
FIG. 1 shows a bar graph depicting the resistance of polychloroprene to cleavage of HCl.

Other than in the operating examples, or where otherwise indicated, all numbers or expressions referring to quantities of ingredients, reaction conditions, etc. used in the specification and claims are to be understood as modified in all instances by the term "about."

It has been found that by combining polychloroprene dispersions with specific aqueous nano ZnO dispersions, adhesive formulations can be obtained which do not form sediments and which do not display any specks even when being processed to form very thin films. They have high resistance to the cleavage of HCl.

Thus, the present invention relates to a composition containing:
a) polychloroprene particles,
b) zinc oxide particles whose average particle size is less than 150 nm and
c) water.

The composition is present in particular in the form of an aqueous dispersion.

Polychloroprene particles according to the invention are understood to be particles of polychloroprene (poly(2-chloro-1,3-butadiene) and chloroprene-containing copolymers.

The polychloroprene (poly(2-chloro-1,3-butadiene) particles are appropriately added to the composition according to the invention in the form of aqueous dispersions. The production of such polychloroprene dispersions is known per se and they are produced for example by the emulsion polymerization of chloroprene and optionally an ethylenically unsaturated monomer copolymerizable with chloroprene in an alkaline medium, as described for example in WO02/24825 (cf. the section from line 26 on page 3 to line 4 on page 7), DE-A 3 002 734 (cf. the section from line 23 on page 8 to line 9 on page 12) or U.S. Pat. No. 5,773,544 (cf. the section from line 9 in column 2 to line 45 in column 4). Polychloroprene dispersions are particularly preferred which are produced by continuous polymerization, as described for example in example 2 of WO 02/24825 and example 6 of DE-A 3 002 734, it being possible to vary the modifier content from between 0.01% by weight and 0.3% by weight.

In a preferred variant of the invention the polychloroprene particles have an average primary particle diameter or particle size of less than 220 nm as determined by DIN 53206.

The term "primary particles" refers, analogously to DIN 53206; 1992-08, to particles identifiable as individual particles by suitable physical processes. The term "diameter" can be used when referring to polychloroprene particles, since they are approximately spherical.

According to the invention, the average primary particle diameter of the polychloroprene particles is preferably determined using an ultracentrifuge; cf: H. G. Müller, Progr. Colloid Polym. Sci. 107, 180–188 (1997). The values refer to the weight average.

An average primary particle diameter of greater than 220 nm is disadvantageous since undesired sedimentation occurs when removing the remaining 2-chloro-1,3-butadiene monomer from the polychloroprene dispersion by steam distillation.

In an additional preferred variant of the invention the polychloroprene particles have an average primary particle diameter of greater than 60 nm.

An average primary particle diameter of less than 60 nm is disadvantageous since the polymer dispersion can only be concentrated with great difficulty to a solids content of >55% by weight.

The polychloroprene particles preferably have an average primary particle diameter of about 60 to about 220 nm, and more preferably of about 70 to about 160 nm.

The abovementioned average primary particle diameters of the polychloroprene particles are present both in the aqueous dispersions used for the production of the compositions according to the invention and in the resulting compositions according to the invention.

The compositions according to the invention also contain zinc oxide particles whose average particle size is less than 150 nm, preferably less than 100 nm and even more preferably less than 50 nm. Since the zinc oxide particles are not spherical, reference is made to average particle size as opposed to average particle diameter.

The zinc oxide particles can be present in the compositions according to the invention both in the form of so-called primary particles and in the form of agglomerates. According to the invention, the term "average particle size of the ZnO particles" refers to the average particle size determined by ultracentrifugation and includes the size of primary particles and optionally existing agglomerates (cf: H. G. Müller, Prog. Colloid Polym. Sci. 107, 180–188 (1997)). The values refer to the weight average.

The weight-averaged average particle size determined by ultracentrifugation is at most 150 nm and preferably at most 100 nm and particularly preferably at most 50 nm, at least 90% by weight of all of the particles preferably being smaller than 200 nm, preferably smaller than 150 nm and particularly preferably smaller than 100 nm.

An average particle size of greater than 150 nm is disadvantageous since there is then the danger of sedimentation and the product is less reactive. By means of TEM photographs (transmission electron-microscopic photographs) it is also possible to determine the number-average particle size of the ZnO primary particles by counting and statistical analysis according to WO 00/50503. As already mentioned above the term "primary particles" refers according to DIN 53206; 1992–08 to particles identifiable as individual particles by suitable physical processes.

The average particle size of the primary particles is at most 100 nm, preferably at most 50 nm, more preferably at most 30 nm and even more preferably at most 15 nm.

The zinc oxide particles are appropriately added to the compositions according to the invention in the form of aqueous ZnO dispersions having an average particle size of <150 nm. These aqueous dispersions can additionally contain organic solvents and/or surface-modifying compounds. The ZnO particles can consist either of non-agglomerated ZnO primary particles or ZnO agglomerates or mixtures of dispersed ZnO primary particles and ZnO agglomerates whose dimensions can be as described above.

In an additional preferred variant of the invention the aqueous ZnO dispersion is a zinc oxide sol having an average primary particle size of less than 30 nm, and preferably less than 15 nm. The sol contains water optionally mixed with high-boiling solvents, such as triethanolamine or ethylene glycol. The particle sizes of the aqueous ZnO dispersions employed correspond to the particle sizes in the compositions according to the invention, i.e. their particle sizes do not change to any substantial degree on incorporation into the compositions according to the invention.

In a preferred variant of the invention, the compositions according to the invention contain additional additives, such as in particular silicon dioxide particles. In combination with zinc oxide, the silicon dioxide particles result in an increase in the viscosity of the adhesive dispersion.

Preferably, the average silicon dioxide particle size or the average diameter of the silicon dioxide particles (the particles are approximately spherical), as determined by ultracentrifugation (as mentioned above), is in the range from 1 to 400 nm, more preferably in the range from 5 to 100 nm, and particularly preferably in the range from 8 to 50 nm (weight average determined by ultracentrifuge). The average silicon dioxide particle diameter includes the particle diameter of the primary particles and possibly existing agglomerates.

The silicon dioxide particles are added to the compositions according to the invention preferably in the form of aqueous silicon dioxide dispersions having an average particle size of the $SiO_2$ particles of 1 to 400 nm, preferably 5 to 100 nm and particularly preferably 8 to 50 nm.

Particularly preferably, the abovementioned aqueous silicon dioxide dispersions are added to the compositions according to the invention in the form of water-containing silica sols. The particle sizes of the silica sols employed do not change to any substantial degree on incorporation into the compositions according to the invention.

In an additional preferred variant of the invention the compositions according to the invention contain at least one anti-ageing agent which is different from the abovementioned ZnO particles. The anti-ageing agents are preferably based on oligofunctional secondary aromatic amines and/or oligofunctional substituted phenols.

The aqueous dispersions of zinc oxide having an average particle size of <150 nm preferably used in the present invention for producing the compositions according to the invention can be produced by various processes. Those processes are however particularly suitable in which the zinc oxide particles are produced by precipitation from a zinc salt solution with alkali and then processed further to form a dispersion. Possible examples are as follows:

I) A zinc oxide sol as described for example in WO 00/50503, produced by redispersing zinc oxide gels having an average primary particle size of =15 nm. Suitable solvents are water or water/ethylene glycol mixtures, optionally with the addition of surface-modifying compounds.

or

II) Zinc oxide sols such as for example those described in WO02/083797 having an average primary particle size of <30 nm and an average agglomerate size of <100 nm, produced for example by the process described in WO02/083797.

ZnO dispersions which are produced with surface-modified zinc oxides such as those described for example in DE-A 10 163 256, for example by one of the processes described therein, are also suitable for producing the compositions according to the invention.

Aqueous dispersions of silicon dioxide which can be used for producing the compositions according to the invention have been known for a long time. They have different structures depending on the production process employed.

Silicon dioxide dispersions suitable according to the invention can be obtained on the basis of silica sol, silica gel, pyrogenic silicas or precipitated silicas or mixtures thereof and they are described in DE 10224898.

If $SiO_2$ raw materials present in the form of isolated solids, such as for example pyrogenic or precipitated silica, are used for producing the compositions according to the invention, they are converted by dispersion into an aqueous $SiO_2$ dispersion.

Prior art dispersion devices and preferably such dispersion devices which are suitable for producing high shear rates, such as for example Ultratorrax or dissolver discs, are used for producing the silicon dioxide dispersions.

Preferably such aqueous silicon dioxide dispersions are used whose $SiO_2$ particles have an average particle diameter of 1 to 400 nm, preferably 5 to 100 nm and particularly preferably 8 to 50 nm. If precipitated silicas are used, the particles are comminuted by grinding.

Preferred polymer dispersions according to the invention are those in which the $SiO_2$ particles of the silicon dioxide dispersion d1) are present as discrete non-crosslinked primary particles.

It is also preferred for the $SiO_2$ particles to have hydroxyl groups on their particle surface.

Aqueous silica sols are particularly preferably used as aqueous silicon dioxide dispersions.

The anti-ageing agents d2) are not the zinc oxide particles b) but preferably those based on oligofunctional secondary aromatic amines or oligofunctional substituted phenols such as products of the 6 PPD, DTPD, DDA, BPH or BHT type, etc., as described for example in the "Handbuch für die Gummiindustrie" (The rubber industry manual), 1992 edition, Bayer AG, Leverkusen, Chapter 4 Vulkanox®, page 423. Vulkanox® DDA, a diphenylamine derivative, is particularly effective.

In order to produce the compositions according to the invention aqueous dispersions of components a), b) and d1) are appropriately mixed in portions of:

polychloroprene dispersion (a) 50 to 99.99% by weight,
zinc oxide dispersion (b) 0.01 to 10% by weight,
silicon dioxide dispersion (d1) 0 to 40% by weight, wherein the weight percentages in each case refer to the solids content of the composition, which adds up to 100%. (Unless stated otherwise, the following weight percentages also refer to the solids content.) The solids content refers to the weight of the non-volatile components, such as in particular polychloroprene, ZnO and $SiO_2$. The volatile components include in particular the high-boiling solvents which can be distilled off at up to 250°/15 mm Hg. The solids content adds up to 100% by weight. In addition, the anti-ageing agent (d2) can be added in quantities of preferably 0 to 10% by weight, and preferably 0 to 3% by weight, based on the solids content of the composition.

For the production of phasing-resistant mixtures the polymer dispersions according to the invention preferably have a content of 90 to 99.9% by weight of a polychloroprene dispersion (a) and 10 to 0.1% by weight of a zinc oxide dispersion (b), wherein the percentages relate to the solids content of the composition.

For the production of adhesives having optimum resistance to the cleavage of HCl it is also possible to add preferably 0.1–10% by weight, and more preferably 0.2–3% by weight, of an additional anti-ageing agent (d2), preferably based on oligofunctional secondary aromatic amines or oligofunctional substituted phenols (d2) by themselves or in combination with 2% by weight to 30% by weight of a silica sol dispersion (d1).

In addition, the composition according to the invention can contain 0 to 79.99% by weight of other conventional adhesive auxiliaries and additives.

These include for example other polymers, such as for example polyacrylates, polyvinylidene chloride, polybutadiene, polyvinyl acetate and/or styrene/butadiene rubbers which can preferably be added in the form of aqueous dispersions in a quantity of up to 30% by weight, based on the solids content of the composition. Such polymers can be used in order to modify the property spectrum of the adhesive compositions.

Additional examples of the adhesive auxiliaries and additives are for example fillers, such as quartz powder, quartz sand, barite, calcium carbonate, chalk, dolomite or talc, optionally together with wetting agents, such as for example polyphosphates, such as sodium hexametaphosphate, naphthalenesulphonic acid, ammonium or sodium polyacrylic acid salts, the fillers being added in quantities of preferably up to 75% by weight, more preferably 10 to 60% by weight, and even more preferably 20 to 50% by weight and the wetting agents being added in quantities of 0.2 to 0.6% by weight, all percentages being based on the solids quantities of the composition.

The quantity of the fillers added depends, inter alia, on whether the compositions according to the invention are used as adhesives or as sealing agents. When the compositions are used as adhesives, maximum contents of the fillers of about 30 to 40% by weight are preferred, based on the solids content of the composition. A content of polychloroprene particles of more than 40% by weight is preferred.

When the compositions are used as sealing agents, maximum contents of the fillers of about 60 to 75% by weight are preferred, based on the solids content of the composition. A content of the polychloroprene particles of less than 40% by weight is preferred.

Additional suitable auxiliaries are for example organic thickeners such as cellulose derivatives, alginates, starch, starch derivatives, polyurethane thickeners or polyacrylic acid, to be used in quantities of about 0.01 to 1% by weight, based on the solids content, or inorganic thickeners, such as for example bentonite, to be used in quantities of 0.05 to 5% by weight, based on the solids content.

For preserving the adhesive composition according to the invention fungicides can also be added thereto. They are used for example in quantities of 0.02 to 1% by weight, based on the non-volatile components. Suitable fungicides are for example phenol and cresol derivatives or organotin compounds.

It is also possible optionally to add tackifying resins, such as for example non-modified or modified natural resins, such as rosin esters, hydrocarbon resins or synthetic resins such as phthalate resins of the polymer dispersion according to the invention in a dispersed form (see for example R. Jordan and R. Hinterwaldner, in "Klebharze" (Adhesive resins), pages 75–115, Hinterwaldner Verlag Munich, 1994). Alkyl phenol resin and terpenephenol resin dispersions having softening points of higher than 70° C., and particularly preferably higher than 110° C., are preferred.

In addition, plasticizers, such as for example those based on adipate, phthalate or phosphate, can be added, for example in quantities of 0.5 to 10% by weight, based on the solids content.

Based on the total weight of the composition, the solids content of the composition according to the invention is preferably at least about 50% by weight, more preferably at least about 60% by weight, and even more preferably more than 70% by weight, corresponding to a content of the volatile components in the composition according to the invention of preferably less than about 50% by weight, more preferably less than about 40% by weight, and even more preferably less than about 30% by weight.

The water content, based on the total weight of the volatile components of the composition according to the invention, is preferably up to 50 to 100% by weight.

Organic solvents, such as for example toluene, xylene, butyl acetate, methyl ethyl ketone, ethyl acetate, dioxan, triethanolamine, ethylene glycol or mixtures thereof can be contained in the composition according to the invention. The organic solvents can be added to the water-containing compositions according to the invention in small quantities of at most about 50% by weight, based on the total quantity of volatile components. They are used for example for improving adhesion to substrates which are difficult to bond.

The invention also relates to a process for producing the compositions according to the invention, characterized in that a water-containing polychloroprene dispersion (a) is mixed with a water-containing zinc oxide dispersion (b) and optionally with a silicon dioxide dispersion (d2) and/or an anti-ageing agent (c1) and optionally the conventional adhesive auxiliaries and additives are added.

A preferred process for producing the compositions according to the invention is characterized in that a water-containing polychloroprene dispersion (a) is initially mixed with a water-containing zinc oxide dispersion (b) and the anti-ageing agent (d1) and with the adhesive auxiliaries and additives and the silica sols (d2) are added during or after mixing.

The adhesive formulation can be applied by known methods, such as for example by brushing, pouring, knifecoating, spraying, rolling or dipping. The drying of the adhesive film can be carried out at room temperature or at an elevated temperature of up to 220° C.

Preferably application is carried out by a spraying process, such as for example that described in EP 0 624 634 B1.

The compositions according to the invention can be used as adhesives or as sealing agents. They are preferably used as adhesives.

According to DIN 16920, an adhesive is a non-metallic substance which can bond the parts to be joined by surface adhesion and inner strength (cohesion).

The adhesives according to the invention are used for example for bonding any desired substrates of identical or different types, such as wood, paper, plastics, textiles, leather, rubber or inorganic materials, such as ceramics, stoneware, glass fibres or cement, but also for the impregnation, coating and lamination of fabrics and paper, as binders for fibres or for strengthening shoe caps and as insulating materials.

EXAMPLES

A. Substances Used

TABLE 1

Polychloroprene dispersion

| Dispersion | Type of polychloroprene | Product |
|---|---|---|
| Dispercoll ® C 84 | pH 12, highly crystallizing, gel-free, solids content 55 +/− 0.5% chloroprene homopolymer | Bayer Material Science AG, Germany |

The average particle diameter of the polychloroprene particles was 95 nm.

TABLE 2

Silicon dioxide dispersion

| Product | Supplier | Supply form | Type |
|---|---|---|---|
| Dispercoll ® S 3030 | Bayer Material Science AG, Germany | 30% dispersion, spec. surface area (m²/g): 300, average particle diameter about 9 nm | silica sol |

TABLE 3

ZnO dispersion employed according to the invention

| Product | Zinc oxide content | Function | Manufacturer |
|---|---|---|---|
| Nano zinc oxide dispersion A (see below) | 20% | Stabilizer | Bayer Material Science AG, Germany |

TABLE 4

Additives and auxiliaries

| Product | Solids content | Function | Manufacturer |
|---|---|---|---|
| Bayoxide ® Z VP 9802 (Zinc oxide dispersion not according to the invention) | 50% | Stabilizer | Borchers GmbH, Langenfeld, Germany |

TABLE 4-continued

Additives and auxiliaries

| Product | Solids content | Function | Manufacturer |
|---|---|---|---|
| Rhenofit ® DDA-50 EM (Diphenylamine derivative dispersion) | 50% | Anti-ageing agent | Rhein Chemie GmbH, Mannheim, Germany |
| Levanyl ®-blue (G-LF) (Phthalocyanine/copper complex dispersion) | 43% | Dye | Bayer Material Science AG, Germany |
| Dermulsene ® TR 93 (Terpenephenol resin dispersion) | 50% | Resin | DRT, Cedex, FR |

Bayoxide®Z VP 9802 aqueous zinc oxide dispersion having a particle size of 50,000–150,000 nm.

Production of the Nano Zinc Oxide Dispersion A Employed According to the Invention The nano zinc oxide dispersion A is produced according to example 1 described in WO00/50503 (production of a zinc oxide gel in methanol from zinc acetate dihydrate). The production of the zinc oxide sol from the zinc oxide gel is carried out according to example 7 of this patent, the zinc oxide gel being mixed only with water and triethanolamine and the methanol content being stripped off in vacuo, so that a nano zinc oxide dispersion in triethanol/water is obtained. The average primary particle size is 10.5 nm (number average) and the zinc oxide content is 20%.

C. Testing Methods

C1 Determination of the Spraying Properties

Device employed: A spray-mixing unit from Krautzberger GmbH, 65333 Eltville. 2 pressurized containers having a volume of:

1. 1.85 litres type no: 22 A0 012967;

2. 10 litres type no.: 22 A0 012968 and a spray gun and a venting unit.

The 1.85 liter pressurized container must be operated with a maximum pressure of 2.5 bars and the 10 liter pressurized container with a maximum pressure of 6 bars.

The spray-mixing gun has three feed lines for metering the adhesive formulation, the coagulant and the atomizing air.

Method of determination: The dispersion is filled into the larger container and the coagulation solution into the smaller container. The spray jet and the adhesive applied are adjusted by the quantity of atomizing air.

In the tests, a 2.5% aqueous calcium chloride solution is used as the coagulating agent. On spraying, the volumetric ratio between the adhesive formulation and the coagulating agent is 10:1.

C2 Determination of the Sedimentation Properties Production of an Adhesive Based on the Polychloroprene Dispersion According to the Invention For the production of the formulation, the polychloroprene dispersion is initially introduced into a glass beaker.

While stirring, the stabilizer, the anti-ageing agent, the resin and, for colouring the dispersion, Levanyl® blue are added. This allows sediments of zinc oxide to be more readily visible.

Rating:

The adhesive mixture is examined daily for phase separation and assessed according to the following legend:

0=no change
1=slight sediment formation on the base
2=high degree of sediment formation on the base
3=solid precipitate on the base C3 Determination of Thermostability (HCl Resistance)

The testing of the dried adhesive samples is carried out according to method B of DIN 53381

Measuring Method:

Measuring device: 763 PVC—Thermomat from Metrohm, 9101 Herisau, Switzerland

The samples (of a thickness of 0.1–1 mm) are cut to an edge length of about 2–3 mm, 0.2 g are weighed into a test tube and the measurement is carried out at 180° C., using air as the carrier gas. The electrical resistance of water in which the HCl gas formed redissolves is measured. The HCl resistance referred to is the point in time at which the electrical resistance reaches a value of 50 µS/cm. The higher the value is, the more resistant the sample tested is to the cleavage of HCl.

D Results:

D1: Determination of the Spraying Properties

TABLE 5

Production of the formulation for comparison tests
(Values in parts by weight of the dispersion)

| | Test | | |
|---|---|---|---|
| | 1 | 2*) | Solids content |
| Dispercoll ® C 84 | 100 | 100 | 55% by weight |
| Rhenofit ® DDA 50 EM | 2 | 2 | 50% by weight |
| Borchers 9802 | 4 | | 50% by weight |
| Nano zinc oxide A | — | 10 | 20% by weight |
| Dermulsene ® TR 93 | 30 | 30 | 50% by weight |

*)example according to the invention

Spraying Properties:

| | Test | |
|---|---|---|
| | 1 | 2*) |
| Day 1 | 1 hour with no problems | 1 hour with no problems |
| Day 2 | Nozzle blocked after 20 mins | 1 hour with no problems |
| Day 3 | After 5 mins the nozzle is blocked in several places. The device has to be dismantled and cleaned. | 1 hour with no problems |
| Day 4 | After 5 mins the nozzle is blocked in several places. The device has to be dismantled and cleaned. | 1 hour with no problems |

*)example according to the invention

As test 1 shows, zinc oxide is sedimented during the resting phase in the vessel and the pipe, so that it is no longer possible to start the test without problems on the $2^{nd}$ and $3^{rd}$ days. On using nano zinc oxide according to the invention the dispersion can be sprayed without any problems even after it has been left to stand in the device for a long period.

D2: Determination of the Sedimentation Properties

TABLE 6

Production of the formulation for the comparison tests
(Percentages in parts by weight of the dispersion)

| | No. | | |
|---|---|---|---|
| | 3 | 4*) | Solids content |
| Dispercoll ® C 84 | 100 | 100 | 55% by weight |
| Rhenofit ® DDA 50 EM | 2 | 2 | 50% by weight |
| Borchers 9802 | 4 | | 50% by weight |
| Nano zinc oxide A | — | 10 | 20% by weight |
| Levanyl ®-blue | 0.05 | 0.05 | |
| Dermulsene ® TR 93 | 30 | 30 | 50% by weight |

*)example according to the invention
**)based on the zinc oxide content

Sedimentation properties of the finished formulation

| | Test | |
|---|---|---|
| | 3 | 4*) |
| Day 1 | 0 | 0 |
| Day 2 | 1 | 0 |
| Day 3 | 2 | 0 |
| Day 4 | 2 | 0 |
| Day 5 | 3 | 0 |
| Day 14 | 3 | 0 |
| Day 21 | 3 | 0 |

*)example according to the invention

On using the nano zinc oxide according to the invention (mixture 4) no phase separation takes place, whereas a sediment of zinc oxide is formed in standard formulation 3 after only one day, which condenses to form a solid deposit after a few days.

D3: Determination of Thermostability

D3.1 Thermostability of a Polychloroprene Formulation in the Presence of Nano Silicon Dioxide Values in parts by weight of the dispersion (in grams)

| | No. | | | | | | | | | |
|---|---|---|---|---|---|---|---|---|---|---|
| | 5*) | 6*) | 7*) | 8*) | 9*) | 10*) | 11*) | 12*) | 13*) | 14*) |
| Dispercoll ® C 84 | 100 | 100 | 100 | 100 | 100 | 100 | 100 | 100 | 100 | 100 |
| Rhenofit ® DDA 50 EM | 2 | 2 | 2 | 2 | 2 | 2 | 2 | 2 | 2 | 2 |
| Dispercoll ® S 3030 | 30 | 30 | 30 | 30 | 30 | 30 | 30 | 30 | 30 | 30 |
| Nano zinc oxide A (20% zinc oxide) | 1** | 2** | 3** | 4** | 5** | 6** | 7** | 8** | 9** | 10** |
| Borchers 9802 (50% zinc oxide) | — | — | — | — | — | — | — | — | — | — |
| Solids content of the formulation in g | 65.2 | 65.4 | 65.6 | 65.8 | 66.0 | 66.2 | 66.4 | 66.6 | 66.8 | 67.0 |
| Zinc oxide content in % | 0.31 | 0.61 | 0.91 | 1.21 | 1.52 | 1.81 | 2.11 | 2.40 | 2.69 | 2.99 |
| HCl resistance in minutes | 230 | 235 | 220 | 380 | 400 | 500 | 555 | 690 | 680 | 700 |

*)example according to the invention

| | No. | | | | |
|---|---|---|---|---|---|
| | 15 | 16 | 17 | 18 | 19 |
| Dispercoll ® C 84 | 100 | 100 | 100 | 100 | 100 |
| Rhenofit ® DDA 50 EM | 2 | 2 | 2 | 2 | 2 |
| Dispercoll ® S 3030 | 30 | 30 | 30 | 30 | 30 |
| Nano zinc oxide A (20% zinc oxide) | — | — | — | — | — |
| Borchers 9802 (50% zinc oxide) | 0.4 | 1.6 | 2.4 | 3.2 | 4 |
| Solids content of the formulation in g | 65.2 | 65.8 | 66.2 | 66.6 | 67.0 |
| Zinc oxide content in % | 0.3 | 1.21 | 1.81 | 2.4 | 2.98 |
| HCl resistance in minutes | 120 | 260 | 320 | 270 | 420 |

*)example according to the invention

FIG. 1 shows the resistance of polychloroprene to cleavage of HCl.

As is clear from the diagram, the nano zinc oxide dispersion according to the invention (tests 5–14) produces considerably improved resistance of polychloroprene to cleavage of HCl compared with a corresponding standard ZnO dispersion.

D3.1: Thermostability of a Polychloroprene Formulation not Containing any Nano Silicon Dioxide Dispersion Values in parts by weight of the dispersion (in grams)

| | No. | | | | |
|---|---|---|---|---|---|
| | 20 | 21 | 22 | 23*) | 24*) |
| Dispercoll ® C 84 | 100 | 100 | 100 | 100 | 100 |
| Rhenofit ® DDA 50 EM | 2 | 2 | 2 | 2 | 2 |
| Nano zinc oxide A | — | — | — | 5*) | 1.25*) |
| Borchers zinc oxide 9802 | — | 2 | 0.5 | — | — |
| Solids content of the formulation | 56 | 57 | 56.25 | 57.8 | 56.45 |
| Zinc oxide content in % | 0 | 1.75 | 0.44 | 1.73 | 0.44 |
| HCl resistance (in minutes) | 30 | 228 | 102 | 408 | 140 |

*)example according to the invention

The table shows that the ZnO-free formulation no. 20 has only slight resistance to cleavage of HCl and a conventional ZnO dispersion (nos. 21 and 22) improves resistance to cleavage of HCl, whereas identical quantities of the zinc oxides (nos. 23 and 24) according to the invention considerably increase resistance.

As a comparison of tests 6, 7 and 25 shows, the addition of nano silicon dioxide to a dispersion having a low content of zinc oxide produces additional resistance to the cleavage of HCl.

What is claimed is:

1. A composition comprising:
   a) polychloroprene particles,
   b) zinc oxide particles whose average particle size is less than 150 nm (weight average determined by ultracentrifuge) and
   c) water.

2. The composition according to claim 1, wherein the polychloroprene particles have an average primary particle diameter of less than 220 nm (weight average determined by ultracentrifuge).

3. The composition according to claim 1 further comprising
   d1) silicon dioxide particles and/or
   d2) at least one anti-ageing agent which is different from component b).

4. The composition according to claim 3 containing silicon dioxide particles having an average particle diameter in the range from 1 to 400 nm (weight average determined by ultracentrifuge).

5. The composition according to claim 3 which has been obtained using a water-containing silica sol.

6. The composition according to claim 1, wherein zinc oxide particles are present in the form of zinc oxide particle agglomerates.

7. The composition according to claim 1, wherein the average primary particle size of the zinc oxide particles is less than 100 nm (weight average determined by ultracentrifuge).

8. The composition according to claim 1 which has been obtained using a water-containing zinc oxide sol.

9. The composition according to claim 1 which contains zinc oxide particles having an average primary particle size of less than 30 nm (weight average determined by ultracentrifuge).

10. The composition according to claim 1 which also contains at least one surface-active agent.

11. The composition according to claim 1 which contains:
20 to 99.99% by weight of polychloroprene particles,
0.01 to 10% by weight of zinc oxide particles,
0 to 40% by weight of silicon dioxide particles,
0 to 10% by weight of at least one anti-ageing agent which is different from zinc oxide,
0 to 79.99% by weight of other conventional adhesive auxiliaries and additives and
water,
wherein the percentages by weight relate to the solids content of the composition, which adds up to 100%.

12. The composition according to claim 11 which contains more than 50% by weight of polychloroprene particles.

13. An adhesive composition including zinc oxide particles having an average particle size of less than 100 nm (weight average determined by ultracentrifuge), as an anti-ageing agent.

14. A method of producing an adhesive composition comprising combining zinc oxide particles having an average particle size is less than 100 nm (weight average determined by ultracentrifuge) with a polychloroprene-containing adhesive composition.

15. A process for producing the composition according to claim 1 comprising mixing a water-containing polychloroprene dispersion with a water-containing zinc oxide dispersion and optionally a water-containing silicon dioxide dispersion and optionally conventional adhesive auxiliaries selected from the group consisting of polyacrylates, polyvinylidene chloride, polybutadiene, polyvinyl acetate, styrene/butadiene rubbers, fillers, wetting agents, thickeners, fungicides, tackifying resins, plasticizers, solvents, and combinations thereof.

16. A method of bonding substrates comprising applying the composition according to claim 1 to a surface of at least one substrate and contacting that surface with a surface of another substrate.

17. A process for producing bonded substrates which comprises applying at least one composition according to claim 1 to at least one surface of at least one substrate and subsequently bonding the coated substrate with at least one additional, optionally coated substrate.

18. Bonded substrates obtained according to claim 17.

19. The composition according to claim 2 further comprising
   d1) silicon dioxide particles and/or
   d2) at least one anti-ageing agent which is different from component b).

20. The composition according to claim 4 which has been obtained using a water-containing silica sol.

* * * * *